United States Patent [19]

Sawada et al.

[11] Patent Number: 4,917,818
[45] Date of Patent: Apr. 17, 1990

[54] NEMATIC LIQUID CRYSTAL COMPOSITION

[75] Inventors: Shinichi Sawada; Toyoshiro Isoyama, both of Ichihara; Tetsuya Matsushita, Sodegaura; Kenji Furukawa, Yokosuka, all of Japan

[73] Assignee: Chisso Corporation, Japan

[21] Appl. No.: 238,509

[22] Filed: Aug. 31, 1988

[30] Foreign Application Priority Data

Sep. 8, 1987 [JP] Japan .................................. 62-224737

[51] Int. Cl.⁴ .......................... C09K 19/34; G02F 1/13
[52] U.S. Cl. .............................. 252/299.61; 252/299.5; 252/299.63; 350/350 R
[58] Field of Search ........... 252/299.5, 299.63, 299.61; 350/350 R

[56] References Cited

U.S. PATENT DOCUMENTS

| | | | |
|---|---|---|---|
| 4,643,841 | 2/1987 | Ishii et al. | 252/299.61 |
| 4,684,220 | 8/1987 | Shionozaki et al. | 252/299.61 |
| 4,705,870 | 11/1987 | Takatsu et al. | 252/299.63 |
| 4,722,804 | 2/1988 | Ishii et al. | 252/299.61 |
| 4,799,774 | 1/1989 | Baur et al. | 252/299.61 |

FOREIGN PATENT DOCUMENTS

| | | | |
|---|---|---|---|
| 206208 | of 0000 | European Pat. Off. | |
| 268226 | of 0000 | European Pat. Off. | |
| 3404117 | 8/1985 | Fed. Rep. of Germany | 252/299.61 |
| 62-100581 | 5/1987 | Japan | 252/299.61 |
| 1069413 | 4/1985 | U.S.S.R. | 252/299.61 |
| 1063100 | 6/1985 | U.S.S.R. | 252/299.61 |
| 1063101 | 6/1985 | U.S.S.R. | 252/299.61 |
| 2153345 | 8/1985 | United Kingdom | 252/299.61 |
| 8807992 | 10/1988 | World Int. Prop. O. | 252/299.61 |

OTHER PUBLICATIONS

Grebyonkin, M. F., et al., Mol. Cryst. Liq. Cryst., vol. 129, pp. 245–257 (1985).
"Physical Properties of Nematic Tolans", Mol. Cryst. Liq. Cryst., 141, pp. 279–287 (1986).

Primary Examiner—Teddy S. Gron
Attorney, Agent, or Firm—Leydig, Voit & Mayer

[57] ABSTRACT

A nematic liquid crystal composition for multiplex drive display elements having superior characteristics, particularly a steep voltage-transmittance characteristic, is provided which composition comprises:

(1) 10 to 50% by weight of first component comprising compound(s) of the formula

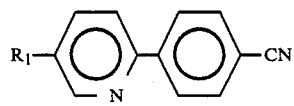
(I)

wherein $R_1$ 1–8C alkyl and (2) 20 to 90% by weight of a second component comprising compounds of the following formulas (II), (III), (IV), (V) and (VI), the respective contents of which are 0–40, 0–50, 0–40, 0–40 and 0–40% by weight, the total weight of the first and second components being 60% by weight or more:

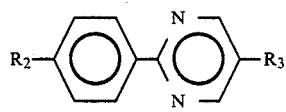

(II)

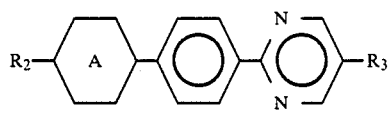

(III)

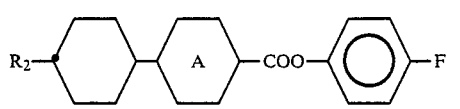

(IV)

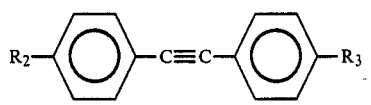

(V)

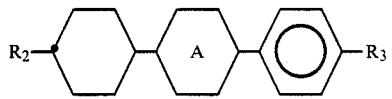

(VI)

wherein $R_2$ is 1–10C alkyl, $R_3$ is 1–10C alkyl or alkoxy

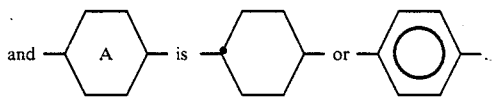

12 Claims, No Drawings

NEMATIC LIQUID CRYSTAL COMPOSITION

BACKGROUND OF THE INVENTION

1. Field of the Invention

This invention relates to a liquid crystal composition suitable as a liquid crystal material used for TN mode liquid crystal elements, particularly for multiplex drive mode display elements.

2. Description of the Related Art

In recent years, applications of liquid crystal display elements have been broadened from those in the fields of watches, electronic calculators, etc. toward those of various information processing terminals; thus the information display capacity has been extensively enlarged. One example is a multiplex drive employing voltage-leveling method. However, the number of liquid crystal materials usable for such a mode is small. Specific features generally required for liquid crystal compositions for display elements are as follows:

(A) the compositions are chemically stable and superior in weather resistance and have nematic liquid crystal properties within an operating temperature range in the vicinity of room temperature;

(B) the temperature dependency of the voltage-transmittance characteristic is small and also the viewing angle is broad;

(C) the voltage-transmittance characteristic is steep; etc. However, when liquid crystal display elements are subjected to a high multiplex drive, the specific feature (C) is particularly important among the abovementioned specific features. The specific feature (C) is an important factor directly related to the display contrast and to the level of multiplexing i.e. the visualizability and the information quantity of the cliquid crystal element.

As well known, in the case of a multiplex drive mode utilizing a general voltage-leveling method wherein there is provided a cell provided with scanning electrodes and signal electrodes and having a liquid crystal material placed between these electrodes, the root-mean-square voltage of a selected element (Von) and that of a non-selected element (Voff) are expressed by the following equations:

$$V_{on} = \frac{V_o}{a} \sqrt{\frac{a^2 + N - 1}{N}} \quad 1$$

$$V_{off} = \frac{V_o}{a} \sqrt{\frac{(a-2)^2 + N - 1}{N}} \quad 2$$

wherein a represents the bias ratio, Vo represents the peak value of impressed voltage and N represents the number of scanning lines. As calculated from the conditions for maximizing the ratio of Von/Voff, the optimum bias ratio corresponds to $\sqrt{N}+1$ and depends only on the number of scanning lines N. At that time, the following relationship exists between the operation margin $\alpha$ and the number of scanning lines:

$$\alpha = \frac{V_{on}}{V_{off}} = \sqrt{\frac{\sqrt{N}+1}{\sqrt{N}-1}} \quad 3$$

and as the number of scanning lines is increased, the value of $\alpha$ rapidly approaches to 1. For example, if N=100, then $\alpha=1.1$; thus this indicates that if the impressed voltage varies by about 10%, there occurs the so-called cross-talk where a non-selected element turns to the "on" state.

In order to prevent cross-talk from occurring, the following relationship may be sufficient to come into existence:

$$V_{off} < V_{th} \text{ and } V_{sat} < V_{on} \quad 4$$

wherein Vth and Vsat represent the threshold root-mean-square voltage and the saturation root-mean-square voltage in the voltage-transmittance characteristic of a liquid crystal display element, respectively.

In general, in the case of a multiplex drive, a root-mean-square voltage affording 10% of transmittance in the voltage-transmittance characteristic is often referred to as a threshold voltage and a root-mean-square voltage affording 50% of transmittance therein is often referred to as a saturation voltage. Thus, if the steepness of liquid crystals, $\gamma$, is equal to Vsat/Vth, a condition of $\gamma \leq \alpha$ should be satisfied in order to obtain a display of good contrast. In other words, as the number of scanning lines increases, it is necessary that the $\gamma$ value of liquid crystals approach 1.

SUMMARY OF THE INVENTION

As apparent from the foregoing, the object of the present invention is to provide a liquid crystal composition having particularly (C) the above-mentioned steep voltage-transmittance characteristic in addition to the above-mentioned characteristics (A) and (B).

The present invention resides in a nematic liquid crystal composition for multiplex drive display elements, which composition comprises (1) 10 to 50% by weight of a first component comprising at least one member of compounds expressed by the formula

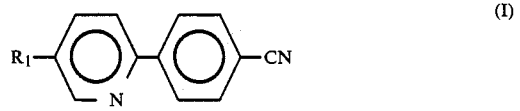

wherein R₁ represents an alkyl group of 1 to 8 carbon atoms, and (2) 20 to 90% by weight of a second component comprising 0 to 40% by weight of at least one member of compounds expressed by the following formula (II), 0 to 50% by weight of at least one member of compounds expressed by the following formula (III), 0 to 40% by weight of at least one member of compounds expressed by the following formula (IV), 0 to 40% by weight of at least one member of compounds expressed by the following formula (V), and 0 and 40% by weight of at least one member of compounds expressed by the following formula (VI), the total weight of said first component and said second component being 60% by weight or more:

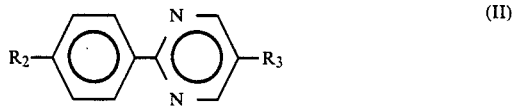

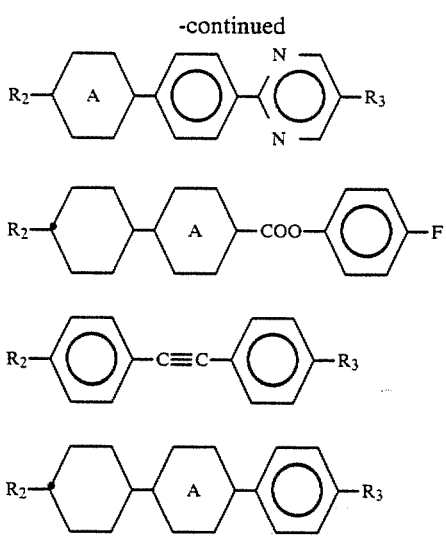

wherein R₂ represents an alkyl group of 1 to 10 carbon atoms, R₃ represents an alkyl group or an alkoxy group each of 1 to 10 carbon atoms and

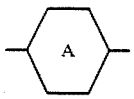

represents

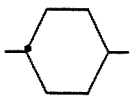

or

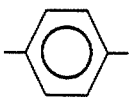

and the respective %s by weight being based on the total weight of said composition.

DETAILED DESCRIPTION OF PREFERRED EMBODIMENTS

In the present invention, the content of 5-alkyl-2-(4-cyanophenyl)pyridines expressed by the formula (I) as the first component is suitably 10 to 50% by weight (based on the total weight of the composition; this applies to the subsequent). The content of the second component is suitably 20 to 90% by weight. Further, the total content of the first component and the second component is necessary to be 60 % by weight or more. If the contents of the respective components and the total content thereof are lower than the respective lower limits, it is difficult to achieve the object of the present invention.

If the content of the first component exceeds 50% by weight, the temperature dependency of the voltage-transmittance characteristic increases to thereby exhibit a tendency to narrow the temperature range in which the display elements are used; thus such excess content is undesirable.

As the first component, 5-alkyl-2-(4-cyanophenyl)-pyridines of the formula (I) wherein $R_1$ represents a linear alkyl group are preferred, and it is more preferred to use a mixture of a plurality of the pyridine compounds of the formula (I) wherein $R_1$ represents a lower linear alkyl group.

The compounds of the formula (I) are characterized in that the value of the elastic coefficient ratio $K_3/K_1$ (wherein $K_3$ represents a bend elastic coefficient and $K_1$ represents a spray elastic coefficient) is small when the compounds are used as liquid crystal materials. For example, a liquid crystal mixture obtained by mixing three compounds of the formula (I) wherein $R_1$ represents ethyl, propyl and butyl, in equal weights (15 parts by weight) with a commercially available nematic liquid crystal mixture (Zli-1083, tradename of product made by Merck Company) (85 parts by weight) has a $K_3/K_1$ ratio of 1.7. This value is smaller than $K_3/K_1$ values 2.1 and 1.9 obtained by similar measurement with 4-(trans-4-propylcyclohexyl)benzonitrile and 4-propyl-4'-cyanobiphenyl currently used as liquid crystal materials for multiplex drive displays.

As the second component, the compounds expressed by the formulas (II) to (VI) are used singly or in admixture of two kinds or more. The content of the compound(s) of the formula (II) is preferably 40% by weight or less. The content of the compound(s) of the formula (III) is preferably 50% by weight or less. If the content of the two-ring pyrimidine compound(s) of the formula (II) exceeds 40% by weight, the clearing point of the resulting composition is often reduced; hence such excess is undesirable. Further, if the content of the three-ring pyrimidine(s) of the formula (III) exceeds 50% by weight, the lower limit temperature of the nematic phase of the resulting mixture often rises; hence such excess content is also undesirable.

The compounds of the formula (IV) are liquid crystals having a low viscosity and a clearing point of 150° C. or higher, and its content is preferably 30% by weight or lower in the aspect of the compatibility thereof with the pyridines of the formula (I) and other liquid crystals.

The content of the compounds of the formula (V) is suitably 40% by weight or lower since there is a fear that the clearing point of the resulting composition may be reduced with an excess content of such compound. The compounds of the formula (VI) have both a clearing point of 140° C. or higher and a low viscosity, but the lower limit temperature of the nematic phase of the resulting mixture often rises depending on the combination thereof with the other components; hence the content of the compounds of the formula (VI) is suitably 40% by weight or less.

Among the compounds used as the second component, pyrimidine compounds expressed by the formulas (II) and (III) are particularly preferred. These pyrimidine compounds are preferably used in admixture of a plurality of those of homologues having a lower alkyl group or alkoxy group. Compositions obtained by mixing 15 parts by weight of the two-ring compounds of the formula (II) with 85 parts by weight of the above-mentioned nematic liquid crystal mixture, Zli-1083 made by Merck Company, have an elastic coefficient ratio of $K_3/K_1$ of 1.6 to 1.7, and the ratio of $K_3/K_1$ similarly sought with the three-ring compounds of the formula (III) is about 1.8 to 1.9.

According to the present invention, a nematic liquid crystal composition having a steep voltage-transmittance characteristic is provided. Since this composition exhibits a nematic phase within a broad temperature range including room temperature and a low viscosity, it is preferably used for a liquid crystal display device of a multiplex drive mode employing a voltage-leveling method.

The effectiveness of the present invention will be described in more detail in the examples set forth below.

Reference examples 1 and 2 are examples of compositions wherein previously known phenylcyclohexane compounds and biphenyl compounds are used, respectively, and as compared with the results of the Reference examples, it will be readily seen that the compositions of the present invention are superior in the steepness.

The present invention will be described in more detail by way of examples, but it should not be construed to be limited thereto. In the examples and references examples, the blending proportion of component compounds refers to percentage by weight. In these examples, the voltage-transmittance characteristic was determined by measuring the transmittance in the direction normal to the surface of as a display element, a 90 degree twisted nematic cell provided with a pair of electrodes coated with a polyimide aligning agent and having a cell thickness (d μm) determined under a condition of d×Δn=1.1 μm wherein Δn represents a birefringence of a liquid crystal mixture employed. A voltage affording a transmittance of 10% in the voltage-transmittance characteristic and that affording a transmittance of 50% therein are referred to as threshold voltage (Vth) and saturation voltage (Vsat), and the steepness (γ) in the voltage-transmittance characteristic was made equal to Vsat/Vth.

EXAMPLE 1

A liquid crystal composition consisting of the following compounds was prepared:

as the compound of the formula (I), the following 2 compounds:
  5-ethyl-2-(4-cyanophenyl)pyridine
    10% by weight and
  5-propyl-2-(4-cyanophenyl)pyridine
    10% by weight;

as a group of the compound of the formula (II), the following 3 compounds:
  2-(4-ethylphenyl)-5-ethylpyrimidine
    12% by weight,
  2-(4-ethylphenyl)-5-propylpyrimidine
    12% by weight and
  2-(4-ethylphenyl)-5-butylpyrimidine
    13% by weight; and as the compound of the formula (III), the following 8 compounds:
  2-{4-(trans-4-ethylcyclohexyl)phenyl}-5-propylpyrimidine
    6% by weight,
  2-{4-(trans-4-propylcyclohexyl)phenyl}-5-ethylpyrimidine
    7% by weight,
  2-{4-(trans-4-propylcyclohexyl)phenyl}-5-propylpyrimidine
    7% by weight,
  2{4-(trans-4-propylcyclohexyl)phenyl}-5-butylpyrimidine
    7% by weight,
  2-(4'-ethylbiphenyl-4-yl)-5-butylpyrimidine
    4% by weight,
  2-(4'-ethylbiphenyl-4-yl)-5-hexylpyrimidine
    4% by weight,
  2-(4'-propylbiphenyl-4-yl)-5-butylpyrimidine
    4% by weight and
  2-(4'-propylbiphenyl-4-yl)-5-hexylpyrimidine
    4% by weight.

This liquid crystal composition exhibited a clearing point (nematic-isotropic transition point) of 63.4° C.; an optical anisotropy value (Δn) of 0.181 as measured at 25° C. and by means of a light having a wavelength of 589 nm; a viscosity of 24.2 cp at 20° C.; a threshold voltage (Vth) at 25° C. in the voltage-transmittance characteristic of 1.560 V.; and a γ value therein of 1.222.

EXAMPLE 2

A liquid crystal composition consisting of the following compounds was prepared:

as the compound of the formula (I), the following 3 compounds:
  5-ethyl-2-(4-cyanophenyl)pyridine
    13% by weight,
  5-propyl-2-(4-cyanophenyl)pyridine
    14% by weight and
  5-butyl-2-(4-cyanophenyl)pyridine
    14% by weight;

as a group of the compound of the formula (IV), the following 3 compounds:
  4-fluorophenyl trans-4-(trans-4-propylcyclohexyl)-cyclohexanecarboxylate
    7% by weight,
  4-fluorophenyl trans-4-(trans-4-pentylcyclohexyl)-cyclohexanecarboxylate
    7% by weight and
  4-fluorophenyl 4-(trans-4-propylcyclohexyl)-benzoate
    6% by weight; and as compounds of other formulas than formulas (I) to (VI), the following 5 compounds:
  4-butoxyphenyl trans-4-propylcyclohexanecarboxylate
    11% by weight,
  4-ethoxyphenyl trans-4-butylcyclohexanecarboxylate
    8% by weight,
  4-methoxyphenyl trans-4-pentylcyclohexanecarboxylate,
    8% by weight,
  4-ethoxyphenyl trans-4-propylcyclohexanecarboxylate,
    6% by weight, and
  4-ethoxyphenyl trans-4-pentylcyclohexanecarboxylate
    6% by weight.

The characteristics of the composition were measured in the same manner as in Example 1. The results are shown in Table 1.

EXAMPLE 3

A liquid crystal composition consisting of the following compounds was prepared:

as the compound of the formula (I), the following 2 compounds:
  5-propyl-2-(4-cyanophenyl)pyridine
    10% by weight and
  5-butyl-2-(4-cyanophenyl)pyridine
    10% by weight;

as a group of the compound of the formula (II), the following 3 compounds:
  2-(4-ethylphenyl)-5-ethylpyrimidine
    10% by weight,
  2-(4-butylphenyl)-5-ethoxypyrimidine
    9% by weight and
  2-(4-butylphenyl)-5-butoxypyrimidine
    9% by weight;
as a group of the compound of the formula (IV), the following 3 compounds:
  4-fluorophenyl trans-4-(trans-4-propylcyclohexyl)-cyclohexanecarboxylate
    7% by weight,
  4-fluorophenyl trans-4-(trans-4-pentylcyclohexyl)-cyclohexanecarboxylate
    7% by weight and
  4-fluorophenyl 4-(trans-4-propylcyclohexyl)-benzoate
    6% by weight;
as a compound of the formula (VI),
  4-{trans-4-propylcyclohexyl)cyclohexyl}-toluene
    6% by weight; and
as compounds of other formulas, the following 3 compounds:
  4-butoxyphenyl trans-4-propylcyclohexanecarboxylate
    12% by weight,
  4-ethoxyphenyl trans-4-butylcyclohexanecarboxylate
    12% by weight and
  4-{trans-4-(trans-4-propylcyclohexyl)cyclohexyl}-fluorobenzene
    2% by weight.

The characteristics of the composition were measured. The results are shown in Table 1.

EXAMPLE 4

A liquid crystal composition consisting of the following compounds was prepared:
as the compound of the formula (I),
  5-ethyl-2-(4-cyanophenyl)pyridine
    10% by weight;
as the compound of the formula (V), the following 3 compounds:
  4-propyl-4'butoxydiphenylacetylene
    10% by weight,
  4-ethyl-4'-methyldiphenylacetylene
    10% by weight and
  4-ethyl-4'-hexyldiphenylacetylene
    10% by weight;
as the compound of the formula (VI), the following 2 compounds:
  4-{trans-4-(trans-4-propylcyclohexyl)cyclohexyl}-toluene
    10% by weight and
  4-{trans-4-(trans-4-propylcyclohexyl)cyclohexyl}-propylbenzene
    20% by weight; and
as compounds of other formulas, the following 4 compounds:
  4-butoxyphenyl trans-4-propylcyclohexanecarboxylate
    9% by weight,
  4-ethoxyphenyl trans-4-butylcyclohexanecarboxylate
    6% by weight,
  4-methoxyphenyl trans-4-pentylcyclohexanecarboxylate
    6% by weight and
  4-ethoxyphenyl trans-4-propylcyclohexanecarboxylate
    9% by weight.

The characteristics of the composition were measured as in Example 1. The results are shown in Table 1.

REFERENCE EXAMPLE 1

A liquid crystal composition a known material for multiplex drive display elements, a liquid crystal composition consisting of the following 10 compounds was prepared:
  4-(trans-4-ethylcyclohexyl)benzonitrile
    11.1% by weight.
  4-(trans-4-propylcyclohexyl)benzonitrile
    11.1% by weight,
  4-(trans-4-butylcyclohexyl)benzonitrile
    11.1% by weight,
  4-ethoxyphenyl trans-4-propylcyclohexanecarboxylate
    9.4% by weight,
  4-propoxyphenyl trans-4-propylcyclohexanecarboxylate
    8% by weight,
  4-butoxyphenyl trans-4-propylcyclohexanecarboxylate
    12% by weight,
  4-pentyloxyphenyl trans-4-propylcyclohexanecarboxylate
    9.3% by weight,
  4-ethoxyphenyl trans-4-butylcyclohexanecarboxylate
    12% by weight,
  4-butoxyphenyl trans-4-butylcyclohexanecarboxylate
    12% by weight and
  4-ethoxyphenyl trans-4-pentylcyclohexanecarboxylate
    4% by weight.

The characteristics of the composition were measured in the same manner as in Example 1. The results are shown together with those of Examples in Table 1.

REFERENCE EXAMPLE 2

Reference example 1 was repeated except that the three kinds of benzonitriles in Reference example 1 were replaced by the following compounds:
  4'-ethyl-4-cyanobiphenyl
    11.1% by weight,
  4'-propyl-4-cyanobiphenyl
    11.1% by weight and
  4'-butyl-4-cyanobiphenyl
    11.1% by weight
to prepare a nematic composition. Its characteristics were measured. The results are shown in Table 1.

TABLE 1

| Physical properties | Example and Reference Example | | | | | |
|---|---|---|---|---|---|---|
| | Example | | | | Reference example | |
| | 1 | 2 | 3 | 4 | 1 | 2 |
| Clearing point (°C.) | 63.4 | 68.5 | 69.1 | 78.7 | 50.6 | 52.9 |
| Optical anisotropy | 0.181 | 0.143 | 0.139 | 0.147 | 0.085 | 0.121 |
| Viscosity (20° C.) [cp] | 24.2 | 34.0 | 33.4 | 18.9 | 24.9 | 34.5 |
| Vth (25° C.) [V] | 1.560 | 1.350 | 1.860 | 2.790 | 1.740 | 1.610 |
| γ (25° C.) | 1.122 | 1.129 | 1.125 | 1.126 | 1.162 | 1.148 |

What we claim is:
1. A nematic liquid crystal composition for multiplex drive display elements, which composition comprises

(1) 10 to 50% by weight of a first component selected from the group consisting of at least one member of compounds expressed by the formula

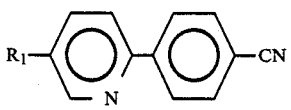 (I)

where $R_1$ represents an alkyl group of 1 to 8 carbon atoms, and (2) 20 to 90% by weight of a second component comprising at least one member of compounds selected from the group consisting of formulas (II)–(VI), the range for each being 0 to 40% by weight of at least one member of compounds expressed by the following formula (II), 0 to 50% by weight of at least one member of compounds expressed by the following formula (III), 0 to 40% by weight of at least one member of compounds expressed by the following formula (IV), 0 to 40% by weight of at least one member of compounds expressed by the following formula (V), and 0 to 40% by weight of at least one member of compounds expressed by the following formula (VI), the total weight of said first component and said second component being 60% by weight or more:

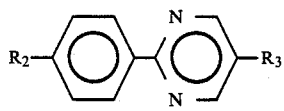 (II)

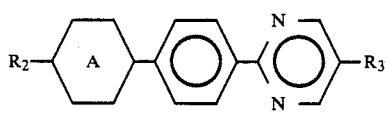 (III)

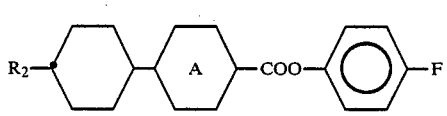 (IV)

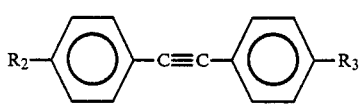 (V)

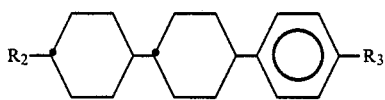 (VI)

wherein $R_2$ represents an alkyl group of 1 to 10 carbon atoms, $R_3$ represents an alkyl group of an alkoxy group each of 1 to 10 carbon atoms and

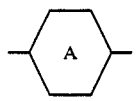

represents

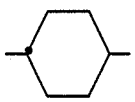

or

, and the respective %s by weight based on the total weight of said composition.

2. A nematic liquid crystal composition according to claim 1 wherein $R_1$ is a linear alkyl group.

3. A nematic liquid crystal composition according to claim 1 wherein a plurality of compounds of formula (I) is employed.

4. A nematic liquid crystal composition according to claim 1 wherein the second component consists essentially of compounds of formulas (II) and (III).

5. A nematic liquid crystal composition according to claim 1 wherein $R_1$ is ethyl, propyl or butyl.

6. A nematic liquid crystal composition according to claim 3 wherein compounds of formula (I) are employed in which $R_1$ is ethyl, propyl and butyl.

7. A nematic liquid crystal composition according to claim 1 wherein $R_2$ is ethyl, propyl, butyl or pentyl.

8. A nematic liquid crystal composition according to claim 1 wherein $R_3$ is ethyl, propyl, butyl, hexyl, ethoxy or butoxy.

9. A nematic liquid crystal composition according to claim 1 comprising:

as the compound of formula (I), the following 2 compounds:
5-ethyl-2-(4-cyanophenyl)pyridine
  10% by weight
and
5-propyl-2-(4-cyanophenyl)pyridine
  10% by weight;

as a group of the compound of formula (II) the following 3 compounds:
2-(4-ethylphenyl)-5-ethylpyrimidine
  12% by weight,
2-(4-ethylphenyl)-5-propylpyrimidine
  12% by weight
and
2-(4-ethylphenyl)-5-butylpyrimidine
  13% by weight;

and as the compound of formula (III), the following 8 compounds:
2-{4-(trans-4-ethylcyclohexyl)phenyl}-5-propyl-pyrimidine
  6% by weight,
2-{4-(trans-4-propylcyclohexyl)phenyl}-5-ethyl-pyrimidine
  7% by weight,
2-{4-(trans-4-propylcyclohexyl)phenyl}-5-propyl-pyrimidine
  7% by weight,
2-{4(trans-4-propylcyclohexyl)phenyl-5-butylpyrimidine
  7% by weight,
2-(4′-ethylbiphenyl-4-yl)-5-butylpyrimidine
  4% by weight, 2-(4'-ethylbiphenyl-4-yl)-5-hexylpyrimidine
4% by weight
2-(4'-propylbiphenyl-4-yl)-5-butylpyrimidine
4% by weight and
2-(4'-propylbiphenyl-4-yl)-5-hexylpyrimidine
4% by weight.

10. A nematic liquid crystal composition according to claim 1 comprising:
as the compound of formula (I), the following 3 compounds:
5-ethyl-2-(4-cyanophenyl)pyridine
13% by weight,
5-propyl-2-(4-cyanophenyl pyridine
14% by weight,
5-butyl-2-(4-cyanophenyl)pyridine
14% by weight;
as a group of the compound of the formula (IV), the following compounds:
4-fluorophenyl trans-4-(trans-4-propylcyclohexyl)-cyclohexanecarboxylate
7% by weight,
4-fluorophenyl trans-4-(trans-4-pentylcyclohexyl)-cyclohexanecarboxylate
7% by weight and
4-fluorophenyl 4-trans-4-propylcyclohexyl)-benzoate
6% by weight; and
as compounds of other formulas than formulas (I) to (VI), the following 5 compounds:
4-butoxyphenyl trans-4-propylcyclohexanecarboxylate
11% by weight,
4-ethoxyphenyl trans-4-butylcyclohexanecarboxylate
8% by weight,
4-methoxyphenyl trans-4-pentylcyclohexanecarboxylate,
8% by weight,
4-ethoxyphenyl trans-4-propylcyclohexanecarboxylate,
6% by weight, and
4-ethoxyphenyl trans-4-pentylcyclohexanecarboxylate
6% by weight.

11. A nematic liquid crystal composition according to claim 1 comprising:
as the compound of formula (I), the following 2 compounds:
5-propyl-2-(4-cyanophenyl)pyridine
10% by weight
and
5-butyl-2-(4-cyanophenyl)pyridine
10% by weight;
as a group of the compound of formula (II), the following 3 compounds:
2-(4-ethylphenyl)-5-ethylpryimidine
10% by weight,
2-(4-butylphenyl)-5-ethoxypyrimidine
9% by weight
and
2-(4-butylphenyl)-5-butoxypyrimidine
9% by weight;
as a group of the compound of formula (IV), the following 3 compounds:
4-fluorophenyl trans-4-(trans-4-propylcyclohexyl)-cyclohexanecarboxylate
7% by weight,
4-fluorophenyl trans-4-(trans-4-pentylcyclohexyl)-cyclohexanecarboxylate
7% by weight and
4-fluoro 4-(trans-4-propylcyclohexyl)-benzoate
6% by weight;
as a compound of formula (VI),
4{trans-4-(trans-4-propylcyclohexyl)cyclohexyl}-toluene
and as compounds of other formulas, the following 3 compounds:
4-butoxyphenyl trans-4-propylcyclohexanecarboxylate
12% by weight,
4-ethoxyphenyl trans-4-butylcyclohexanecarboxylate
12% by weight
and
4-{trans-4-(trans-4-propylcyclohexyl)}-fluorobenzene
2% by weight.

12. A nematic liquid crystal composition according to claim 1 comprising:
as the compound of formula (I),
5-ethyl-2-(4-cyanophenyl)pyridine
10% by weight;
as the compound of the formula (V), the following 3 compositions:
4-propyl-4'-butoxydiphenylacetylene
10% by weight,
4-ethyl-4'-methyldiphenylacetylene
10% by weight
and
4-ethyl-4'-hexyldiphenylacetylene
10% by weight;
as the compound of formula (VI), the following 2 compounds:
4-{trans-4-(trans-4-propylcyclohexyl)cyclohexyl}-toluene
10% by weight
and
4-{trans-4-(trans-4-propylcyclohexyl) cyclohexyl}-propylbenzene
20% by weight;
and as compounds of other formulas, the following 4 compounds:
4-butoxyphenyl trans-4-propylcyclohexanecarboxylate
9% by weight,
4-ethoxyphenyl trans-4-butylcyclohexanecarboxylate
6% by weight,
4-methoxyphenyl trans-4-pentylcyclohexanecarboxylate
6% by weight and
4-ethoxyphenyl trans-4-propylcyclohexanecarboxylate
9% by weight.

* * * * *